United States Patent
Nomura et al.

(10) Patent No.: US 10,562,138 B2
(45) Date of Patent: Feb. 18, 2020

(54) METHOD FOR MANUFACTURING RACK BAR

(71) Applicant: NETUREN CO., LTD., Tokyo (JP)

(72) Inventors: Makoto Nomura, Tokyo (JP); Takashi Yamawaki, Tokyo (JP); Ryosuke Suzuki, Tokyo (JP); Nobumoto Ishiki, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 0 days.

(21) Appl. No.: 15/767,766

(22) PCT Filed: Nov. 4, 2016

(86) PCT No.: PCT/JP2016/004814
§ 371 (c)(1),
(2) Date: Apr. 12, 2018

(87) PCT Pub. No.: WO2017/077717
PCT Pub. Date: May 11, 2017

(65) Prior Publication Data
US 2018/0304422 A1 Oct. 25, 2018

(30) Foreign Application Priority Data

Nov. 4, 2015 (JP) .................................. 2015-217043
Nov. 4, 2015 (JP) .................................. 2015-217044

(51) Int. Cl.
*B23K 20/12* (2006.01)
*B23P 15/14* (2006.01)
(Continued)

(52) U.S. Cl.
CPC ............... *B23P 15/14* (2013.01); *B23F 1/06* (2013.01); *B23K 20/129* (2013.01); *B62D 3/126* (2013.01); *F16H 55/26* (2013.01); *F16H 55/06* (2013.01)

(58) Field of Classification Search
CPC ... B23P 15/14; B23K 20/129; B23K 2101/04; B23K 20/12; B23K 2101/008;
(Continued)

(56) References Cited

U.S. PATENT DOCUMENTS 3,337,108 A * 8/1967 Taylor .................. B23K 20/121
228/2.3
3,377,009 A * 4/1968 Lipp ...................... B23K 20/12
228/2.3
(Continued)

FOREIGN PATENT DOCUMENTS

DE 10 2008 028 768 12/2009
EP 1 215 102 9/2002
(Continued)

OTHER PUBLICATIONS

International Search Report and Written Opinion of the International Searching Authority, dated Feb. 3, 2017 in corresponding International Patent Application No. PCT/JP2016/004814.

*Primary Examiner* — Kiley S Stoner
(74) *Attorney, Agent, or Firm* — Wenderoth, Lind & Ponack, L.L.P.

(57) ABSTRACT

A method for manufacturing a rack bar includes joining axial end portions of first and second bar members to each other, and forming a power transmission section on the second bar member. The first bar member has a toothed portion. When the second bar member is hollow, the method may further include thickening a wall of a portion of the second bar member along the axial direction so as to be coaxial with the first bar member. When the second bar member has a greater diameter than the first bar member, the method may further include cutting an outside diameter of a portion of the second bar member in the axial direction so as to be coaxial with the first bar member. The power transmission section is formed on the portion of the second bar (Continued)

member where the wall has been thickened and/or the outside diameter has been cut.

6 Claims, 14 Drawing Sheets

(51) Int. Cl.
    *B62D 3/12*            (2006.01)
    *F16H 55/26*         (2006.01)
    *B23F 1/06*           (2006.01)
    *F16H 55/06*         (2006.01)

(58) Field of Classification Search
    CPC ............ B23K 20/1205; B23K 37/0443; B23K 2103/04; B23F 1/06; F16H 55/26; F16H 55/06; B62D 3/126; B62D 5/0442; B60Y 2410/124
    USPC ........ 228/112.1–114.5, 2.1–2.3, 141.1–173.7
    See application file for complete search history.

(56) References Cited

U.S. PATENT DOCUMENTS

| | | | | | |
|---|---|---|---|---|---|
| 3,472,996 | A * | 10/1969 | Braid | ................... | B23K 20/129 219/104 |
| 3,580,459 | A * | 5/1971 | Gage | ...................... | B23K 20/12 228/2.3 |
| 3,609,854 | A * | 10/1971 | Hasui | ..................... | B23K 20/12 228/114 |
| 3,717,295 | A * | 2/1973 | Woodall | ................. | B23K 20/12 228/2.3 |
| 3,779,446 | A * | 12/1973 | Lemelson | ................ | B23K 5/08 228/15.1 |
| 3,838,807 | A * | 10/1974 | Nomura | ................. | B23K 20/12 228/2.3 |
| 3,897,896 | A * | 8/1975 | Louw | ..................... | B23K 20/12 228/2.3 |
| 3,954,215 | A * | 5/1976 | Takagi | ................. | B23K 20/121 228/2.3 |
| 4,043,497 | A * | 8/1977 | Jones | ..................... | B23K 20/12 228/2.3 |
| 4,193,722 | A * | 3/1980 | Bishop | .................... | B23F 15/00 409/268 |
| 4,605,151 | A * | 8/1986 | Brown | ................. | B23K 37/053 228/2.3 |
| 5,858,142 | A * | 1/1999 | Tully | .................. | B23K 20/121 156/580 |
| 6,289,710 | B1 * | 9/2001 | Ozeki | .................... | B21K 1/767 72/356 |
| 6,706,127 | B1 * | 3/2004 | Duggirala | ................ | B23P 15/00 148/570 |
| 6,925,899 | B2 * | 8/2005 | Ozeki | .................... | B21K 1/767 74/109 |
| 9,199,662 | B2 * | 12/2015 | Ueno | ....................... | B62D 3/12 |
| 9,884,388 | B2 * | 2/2018 | Sweeting | ............... | B23K 37/04 |
| 2002/0020237 | A1 * | 2/2002 | Tsubouchi | ........... | B21C 37/155 74/422 |
| 2002/0026845 | A1 * | 3/2002 | Tsubouchi | ............. | B21K 1/767 74/457 |
| 2002/0073793 | A1 * | 6/2002 | Tsubouchi | ............. | B21K 1/767 74/422 |
| 2003/0097894 | A1 | 5/2003 | Ozeki | | |
| 2004/0256439 | A1 * | 12/2004 | Pfeiler | ................... | B23K 20/12 228/112.1 |
| 2005/0167182 | A1 * | 8/2005 | Abe | ........................ | B62D 3/12 180/444 |
| 2005/0255927 | A1 * | 11/2005 | Michioka | ............... | B62D 3/126 464/181 |
| 2006/0016238 | A1 * | 1/2006 | Shiokawa | .............. | B21D 17/02 72/370.21 |
| 2006/0113358 | A1 * | 6/2006 | Crasser | .............. | B23K 20/1205 228/112.1 |
| 2007/0051776 | A1 * | 3/2007 | Estes | ..................... | B23K 20/129 228/101 |
| 2007/0057479 | A1 * | 3/2007 | Wolf | ...................... | B62D 3/126 280/93.514 |
| 2007/0137343 | A1 * | 6/2007 | Roeske | ...................... | B21J 5/12 74/424.6 |
| 2007/0204668 | A1 | 9/2007 | Shiokawa | | |
| 2009/0200356 | A1 * | 8/2009 | Kawaura | ................ | B23K 20/12 228/2.3 |
| 2009/0242613 | A1 * | 10/2009 | Kawaura | .............. | B23K 13/015 228/114.5 |
| 2009/0260467 | A1 * | 10/2009 | Kobayashi | ............. | B21D 15/04 74/422 |
| 2010/0162843 | A1 * | 7/2010 | Kobayashi | ............. | B21K 1/767 74/422 |
| 2010/0206861 | A1 * | 8/2010 | Rudolph | .............. | B23K 20/121 219/137 R |
| 2012/0160595 | A1 * | 6/2012 | Fujitomi | .................. | B62D 3/12 180/443 |
| 2012/0258329 | A1 * | 10/2012 | Tanabe | .................... | B21K 25/00 428/600 |
| 2014/0060956 | A1 * | 3/2014 | Takai | ................... | B62D 5/0442 180/444 |
| 2015/0136304 | A1 * | 5/2015 | Onose | ..................... | B23Q 15/02 156/64 |
| 2015/0276037 | A1 * | 10/2015 | Yamawaki | ............. | B21K 1/768 74/640 |
| 2015/0298721 | A1 * | 10/2015 | Suzuki | .................... | B62D 3/126 74/457 |
| 2016/0023300 | A1 * | 1/2016 | Kimura | .................. | B23K 20/12 492/1 |
| 2016/0083823 | A1 * | 3/2016 | Horikami | ............... | C22C 38/001 74/422 |
| 2016/0271726 | A1 | 9/2016 | Suzuki et al. | | |
| 2017/0100796 | A1 | 4/2017 | Suzuki et al. | | |
| 2017/0203781 | A1 * | 7/2017 | Kato | ....................... | B21K 1/768 |
| 2018/0031104 | A1 * | 2/2018 | Yamawaki | ............. | B23P 15/14 |
| 2018/0304422 | A1 * | 10/2018 | Nomura | .................. | B62D 3/126 |
| 2018/0306303 | A1 * | 10/2018 | Inagaki | ................... | B62D 3/126 |

FOREIGN PATENT DOCUMENTS

| | | | |
|---|---|---|---|
| EP | 2 937 265 | 10/2015 | |
| JP | 59209421 A * | 11/1984 | ............ B21K 1/767 |
| JP | 2003-164941 | 6/2003 | |
| JP | 2007-275896 | 10/2007 | |
| JP | 2014-124767 | 7/2014 | |
| WO | 2006/066309 | 6/2006 | |
| WO | 2014/104410 | 7/2014 | |

* cited by examiner

METHOD FOR MANUFACTURING RACK BAR

TECHNICAL FIELD

The present invention relates to a method for manufacturing a rack bar.

BACKGROUND ART

A dual pinion type rack bar is a type of a rack bar for use in a steering apparatus of a vehicle, such as an automobile, having toothed portions at two locations, each toothed portion having a plurality of rack teeth. One of the toothed portions is engaged with a steering pinion of a steering shaft of a vehicle, and the other toothed portion is engaged with an assist pinion of an assisting mechanism. Some dual pinion type rack bars are designed such that the toothed portions at the two locations have an angular difference around the axis, depending on a positional relationship between the steering shaft and the assisting mechanism of the vehicle.

JP2014-124767A discloses a method for manufacturing a dual pinion type rack bar in which a first bar member having a toothed portion and a second bar member arranged coaxially with the first bar member are friction-welded by being rotated relative to each other around the center axis and then another toothed portion is formed on the second bar member by cutting. By forming the toothed portion on the second bar member after joining the first bar member and the second bar member to each other, the accuracy of the angular difference between the toothed portion of the first bar member and the toothed portion of the second bar member is improved.

In this method for manufacturing the rack bar, when there is a misalignment or inclination of the second bar member with respect to the first bar member to which the second bar member has been joined, the straightness of the rack bar is degraded.

SUMMARY

Illustrative aspects of the present invention improve a shape accuracy of a rack bar formed by joining a second bar member to a first bar member formed with a toothed portion having a plurality of rack teeth.

According to an illustrative aspect of the present invention, a method for manufacturing a rack bar is provided. The method includes joining an axial end portion of a first bar member and an axial end portion of a second bar member to each other, the first bar member and the second bar member being hollow members, and the first bar member having a toothed portion along an axial direction, and the toothed portion having a plurality of rack teeth, thickening a wall of at least a portion of the second bar member, that has been joined to the first bar member, along the axial direction such that the portion of the second bar member is coaxial with the first bar member, and forming a power transmission section on the wall-thickened portion of the second bar member.

According to another illustrative aspect of the present invention, another method for manufacturing a rack bar is provided. The method includes joining an axial end portion of the first bar member and an axial end portion of a second bar member to each other, the first bar member having a toothed portion along an axial direction, the toothed portion having a plurality of rack teeth, and the second bar member having a greater diameter than the first bar member, cutting an outside diameter of at least a portion of the second bar member, that has been joined to the first bar member, in the axial direction such that portion of the second bar member is coaxial with the first bar member, and forming a power transmission section on the portion of the second bar member where the outside diameter has been cut.

DESCRIPTION OF EMBODIMENTS

Figure 1:
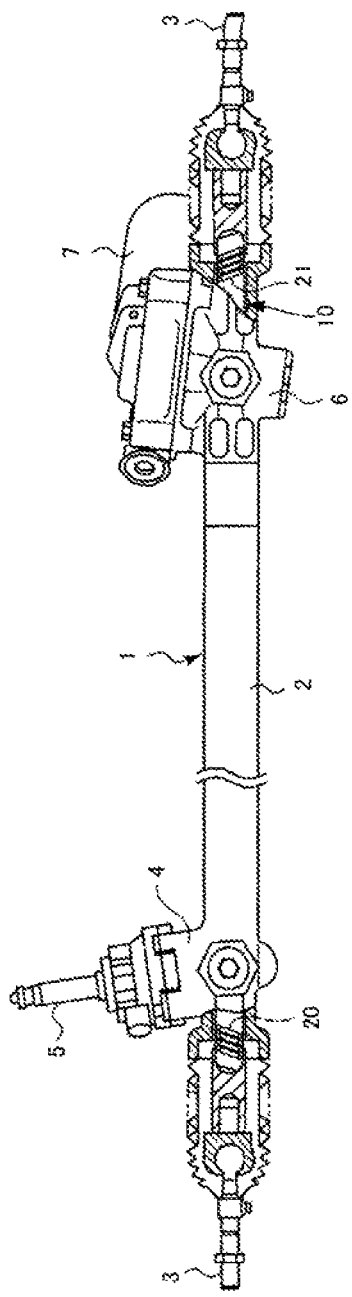
FIG. 1 is a front view of an example of a steering apparatus according to an embodiment of the present invention.

FIG. 1 illustrates an example of a steering apparatus 1 according to an embodiment of the present invention.

The steering apparatus 1 has a rack housing 2 and a rack bar 10 that is housed in the rack housing 2 so as to be slidable in an axial direction.

A tie rod 3 is connected to each end of the rack bar 10 via a joint. The wheels of a vehicle are turned by the movement of the rack bar 10 via the tie rods 3 and a steering mechanism to which the tie rods 3 are connected.

A steering gear box 4 is provided at one axial end portion of the rack housing 2. A steering pinion (not shown) formed on an input shaft 5 to be connected to a steering shaft is housed in the steering gear box 4. An assist gear box 6 is provided at the other axial end of the rack housing 2. An assist pinion (not shown) to be driven by the motor 7 of an assisting mechanism is housed in the assist gear box 6.

A first toothed portion 20 having a plurality of rack teeth to be engaging with the steering pinion and a second toothed portion 21 having a plurality of rack teeth engaged with the assist pinion are formed on the rack bar 10.

The steering pinion of the input shaft 5 is rotated by the rotating operation of the steering wheel, whereby the rack bar 10 engaged with the steering pinion at the first toothed portion 20 is moved in the axial direction. The driving force of the motor 7 of the assisting mechanism to be controlled depending on the steering force of the steering wheel is transmitted to the rack bar 10 via the assist pinion engaged with the second toothed portion 21, whereby the movement of the rack bar 10 by the rotating operation of the steering wheel is assisted.

Figure 2:
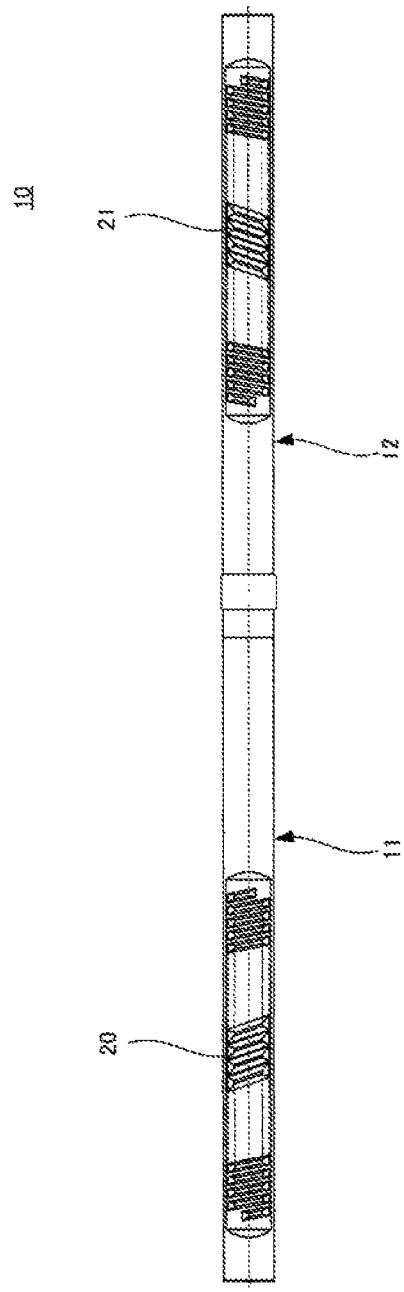
FIG. 2 a front view of a rack bar installed in the steering apparatus.

FIG. 2 illustrates a configuration of the rack bar 10.

The rack bar 10 has a first bar member 11 on which the first toothed portion 20 having the plurality of rack teeth engaged with the steering pinion and a second bar member 12 on which the second toothed portion 21 having the plurality of rack teeth engaged with the assist pinion, and an axial end of the first bar member 11 and an axial end of the second bar member 12 are joined to each other.

In the illustrated example, the first bar member 11 is formed as a hollow member being circular in cross section and made of a metal material, such as carbon steel JIS-S45C. The rack teeth of the first toothed portion 20 of the first bar member 11 formed as a hollow member are formed as described below, for example.

First, a flat teeth forming surface is on a portion of the hollow member in the longitudinal direction where a toothed portion is to be provided (hereafter, teeth forming portion). The teeth forming surface is formed by, for example, deforming the teeth forming portion of the hollow member using a press-forming die.

Next, the hollow member is placed in the forming die including a teeth forming die to be pressed against the teeth forming surface and surrounding the entire teeth forming portion of the hollow member, and a mandrel is inserted into the hollow member. The material of the hollow member at the teeth forming surface is plastically deformed by the inserted mandrel from the inside and is pushed into the teeth forming die that is pressed against the teeth forming surface. This plastic working is repeated with the mandrel to be inserted being exchanged to have a gradually larger size, whereby a plurality of rack teeth corresponding to the teeth forming die is formed on the hollow member.

Figure 3:
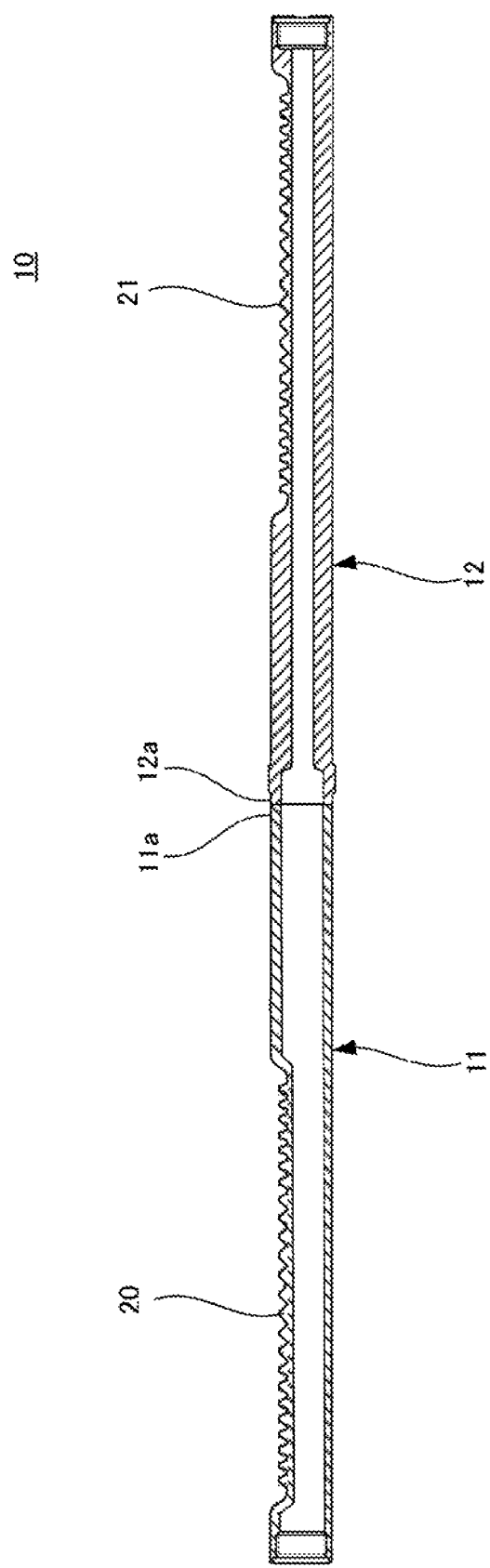
FIG. 3 is a cross-sectional view of a rack bar according to a first embodiment of the present invention.

FIG. 3 illustrates a cross section of the rack bar 10 according to a first embodiment of the present invention. In the first embodiment, the second bar member 12 is also formed as a hollow member being circular in cross section and made of a metal material, such as carbon steel JIS-S45C. The rack teeth of the second toothed portion 21 of the second bar member 12 are formed as described later in detail, for example, by cutting after the second bar member 12 is joined to the first bar member 11.

The profile of the rack teeth of the first toothed portion 20 of the first bar member 11 may be the same as or different from the profile of the rack teeth of the second toothed portion 21 of the second bar member 12, and a constant gear ratio (CGR) and a variable gear ratio (VGR) may be combined.

FIGS. 4 to 7 illustrate steps for manufacturing the rack bar 10 according to the first embodiment.

Figure 4:
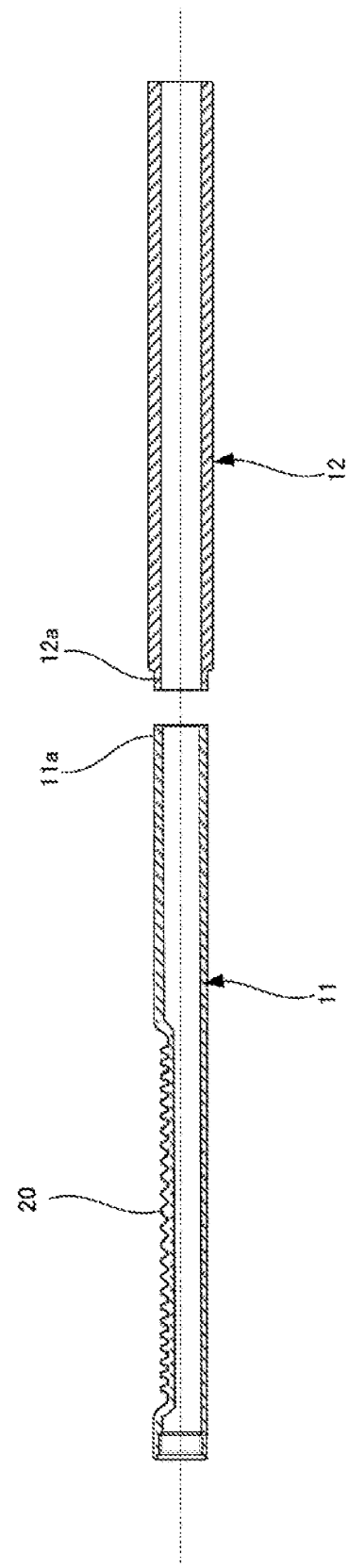
FIG. 4 is a schematic view illustrating a step for manufacturing the rack bar.

As shown in FIG. 4, the first bar member 11 on which the first toothed portion 20 has already been formed and the blank second bar member 12 are coaxially arranged. In the illustrated example, the outside diameter of the blank second bar member 12 is greater than the outside diameter of the first bar member 11. However, the outside diameter of the blank second bar member 12 may be the same as the outside diameter of the first bar member 11, or may be smaller than the outside diameter of the first bar member 11. In the illustrated example, the inside diameter of the blank second bar member 12 is the same as the inside diameter of the first bar member 11. However, the inside diameter of the blank second bar member 12 may be different from the inside diameter of the first bar member 11.

In the illustrated example, the axial end portion 12a (joining end portion) of the second bar member 12 on the side of the first bar member 11 is preformed, for example, by cutting, in a ring shape having the same inside diameter and the same outside diameter as the axial end portion 11a (joining end portion) of the first bar member 11 opposed to the joining end portion 12a. When the outside diameter of the blank second bar member 12 is smaller than the outside diameter of the first bar member 11, upsetting may be performed in advance on the joining end portion 12a of the second bar member 12 so that the outside diameter of the joining end portion 12a is made equal to or greater than the outside diameter of the joining end portion 11a. When the inside diameter of the blank second bar member 12 is greater than the inside diameter of the first bar member 11, the joining end portion 12a of the second bar member 12 may be swaged in advance so that the inside diameter of the joining end portion 12a is made equal to or smaller than the inside diameter of the joining end portion 11a.

Figure 5:
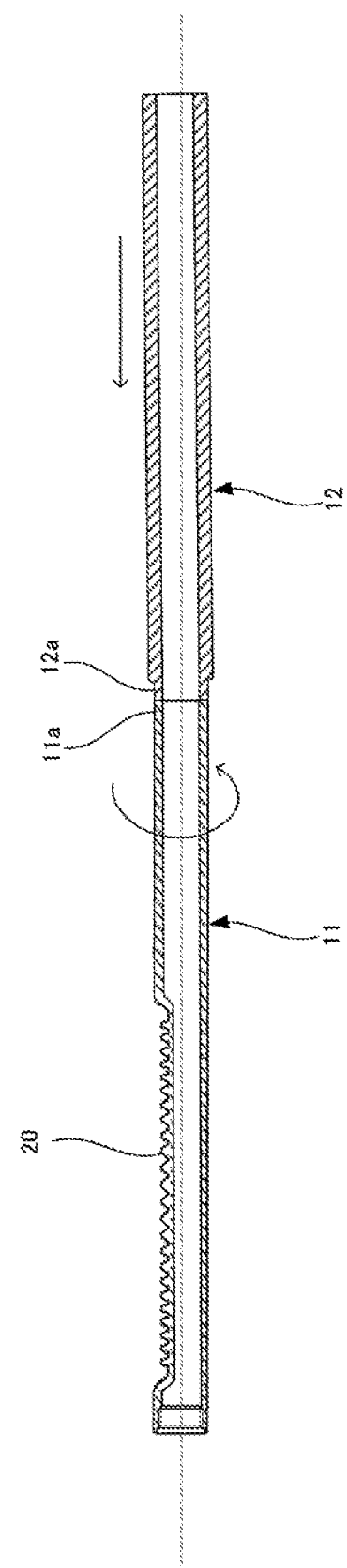
FIG. 5 is a schematic view illustrating another step for manufacturing the rack bar.

As shown in FIG. 5, the second bar member 12 is moved toward the first bar member 11, and the respective end faces of the joining end portion 11a of the first bar member 11 and the joining end portion 12a of the second bar member 12 are abutted against each other. The first bar member 11 is then rotated around its center axis.

The metal structures of the joining end portion 11a and the joining end portion 12a are changed by the friction heat caused by the relative rotation of the respective end faces of the joining end portion 11a of the first bar member 11 and the joining end portion 12a of the second bar member 12 abutted against each other, and pressure is applied to the end faces, whereby the joining end portion 11a and the joining end portion 12a are pressure-welded to each other.

Due to the joining end portion 12a being preformed in a ring shape having the same inside diameter and the same outside diameter as the joining end portion 11a, the plastic flow amount of the joining end portion 11a and the plastic flow amount of the joining end portion 12a around the pressure-welding faces thereof become substantially equal to each other during the friction welding of the joining end portion 11a of the first bar member 11 and the joining end portion 12a of the second bar member 12, whereby the joint between the joining end portion 11a and the joining end portion 12a becomes more secure.

In the state in which the first bar member 11 and the second bar member 12 are joined to each other, misalignment or inclination of the second bar member 12 with respect to the first bar member 11 may occur in some cases, for example, due to assembling errors caused by manufacturing apparatuses and the pressure distribution at the pressure-welded faces during the friction welding.

Figure 6:
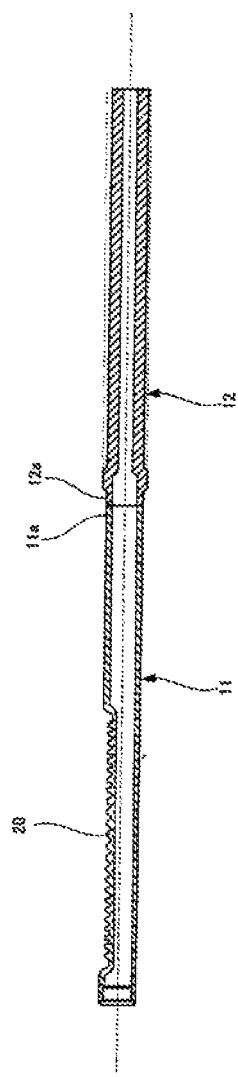
FIG. 6 is a schematic view illustrating another step for manufacturing the rack bar.

Hence, as shown in FIG. 6, the second bar member 12 is corrected so as to be coaxial with the first bar member 11. This correction of the second bar member 12 includes wall-thickening of the second bar member 12. In the illustrated example, the wall of the blank second bar member 12 having a greater outside diameter than the first bar member 11 is thickened by reducing the diameter of the blank second bar member 12 with its axial length being substantially unchanged such that the second bar member 12 has the same outside diameter as the first bar member 11. This wall-thickening of the second bar member 12 may be performed by, for example, swaging the second bar member 12 using a plurality of dies rotating around the circumference of the second bar member 12 and striking the second bar member 12 in the radial direction to change the cross-sectional shape of the second bar member 12. When the outside diameter of the blank second bar member 12 is equal to or smaller than the outside diameter of the first bar member 11, the wall of the second bar member 12 may be thickened by making its axial length shorter. The wall of the second bar member 12 may be thickened such that the outside diameter of the second bar member 12 is different from the outside diameter of the first bar member 11. In the illustrated example, the wall of the second bar member 12 is thickened along the entire axial length of the portion of the second bar member 12 other than the joining end portion 12a. The wall of the second bar member 12 may thickened only along a portion of the second bar member 12 along the axial direction including a section where the second toothed portion 21 is to be formed in a later process.

Figure 7:
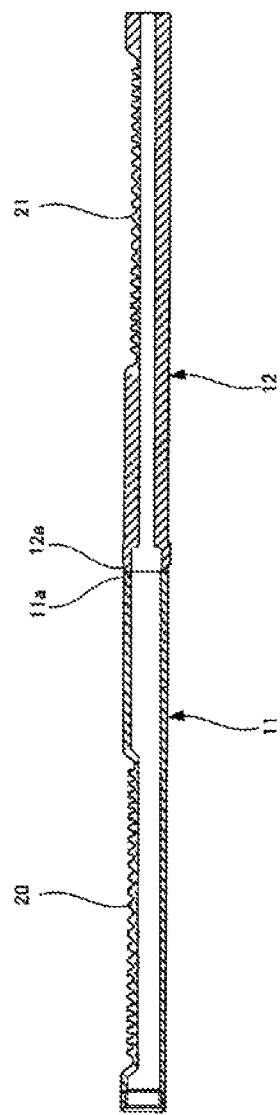
FIG. 7 is a schematic view illustrating another step for manufacturing the rack bar.

Then, as shown in FIG. 7, rack teeth are formed on the portion of the second bar member 12 to form the second toothed portion 21 by cutting using a broaching machine or the like, and heat treatment, such as quenching, may be optionally performed on the second toothed portion 21. Surface finishing, such as grinding, may be performed on the second bar member 12 between the wall-thickening and the teeth cutting.

The rack bar 10 manufactured as described above can be reduced in weight because the first bar member 11 and the second bar member 12 are both hollow.

The wall thickness of the predetermined portion of the second bar member 12 on which the second toothed portion 21 is formed can be obtained securely by increasing the wall thickness of the second bar member 12, whereby the degree of freedom of the shape of the rack teeth of the second toothed portion 21 can be enhanced. Still further, the second bar member 12 can be corrected so as to be coaxial with the first bar member 11 and the straightness of the rack bar 10 can also be enhanced by performing the wall-thickening for the second bar member 12.

Figure 8:
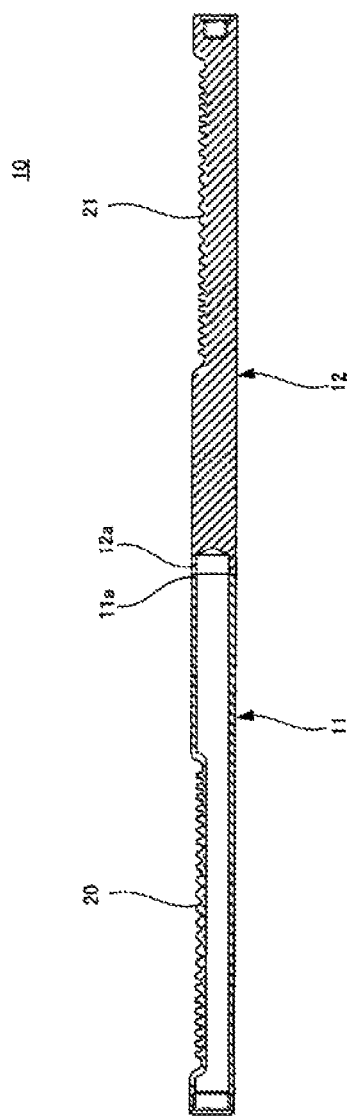
FIG. 8 is a cross-sectional view of a rack bar according to a second embodiment of the present invention.

FIG. 8 illustrates a cross section of a rack bar 10 according to a second embodiment of the present invention.

The second bar member 12 of the rack bar 10 according to the second embodiment is formed as a solid member being circular in cross section and made of a metal material, such as carbon steel JIS-S45C. The rack teeth of the second toothed portion 21 of the second bar member 12 formed as a solid member is formed by cutting, for example.

The first bar member 11 may also be formed as a solid member, and the rack teeth on the first toothed portion 20 of the first bar member 11 formed as a solid member are formed by cutting, for example.

FIGS. 9 to 12 illustrate steps for manufacturing the rack bar 10 according to the second embodiment.

Figure 9:
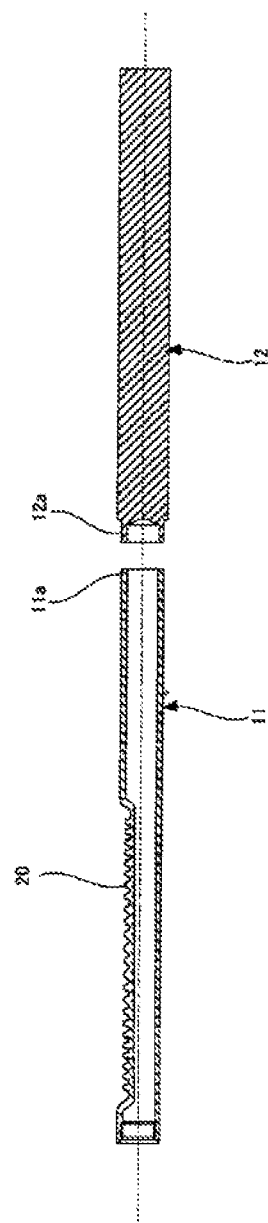
FIG. 9 is a schematic view illustrating a step for manufacturing the rack bar of FIG. 8.

As shown in FIG. 9, the first bar member 11 on which the first toothed portion 20 has already been formed and the blank second bar member 12 are arranged so as to be coaxial with each other. The outside diameter of the blank second bar member 12 is greater than the outside diameter of the first bar member 11.

In the illustrated example, the axial end portion 12a (joining end portion) of the second bar member 12 on the side of the first bar member 11 is preformed, for example, by cutting, in a ring shape having a same shape as, i.e., having the same inside diameter and the same outside diameter as the axial end portion 11a (joining end portion) of the first bar member 11 opposed to the joining end portion 12a. When the first bar member 11 is a solid member, the joining end portion 12a of the second bar member 12 is preformed in a column shape having a same shape as, i.e., having the same outside diameter as the joining end portion 11a.

Figure 10:
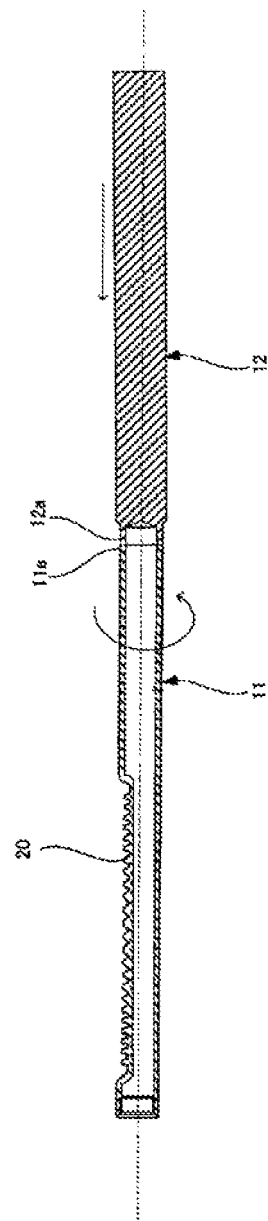
FIG. 10 is a schematic view illustrating another step for manufacturing the rack bar of FIG. 8.

As shown in FIG. 10, the second bar member 12 is moved toward the first bar member 11, and the respective end faces of the joining end portion 11a of the first bar member 11 and the joining end portion 12a of the second bar member 12 are abutted against each other. The first bar member 11 is then rotated around its center axis.

The metal structures of the joining end portion 11a and the joining end portion 12a are changed by the friction heat caused by the relative rotation of the respective end faces of the joining end portion 11a of the first bar member 11 and the joining end portion 12a of the second bar member 12 abutted against each other, and pressure is applied to the end faces, whereby the joining end portion 11a and the joining end portion 12a are pressure-welded to each other.

Due to the joining end portion 12a being preformed in a same shape as the joining end portion 11a, the plastic flow amount of the joining end portion 11a and the plastic flow amount of the joining end portion 12a around the pressure-welding faces thereof become substantially equal to each other during the friction welding of the joining end portion 11a of the first bar member 11 and the joining end portion 12a of the second bar member 12, whereby the joint between the joining end portion 11a and the joining end portion 12a becomes more secure.

Figure 11:
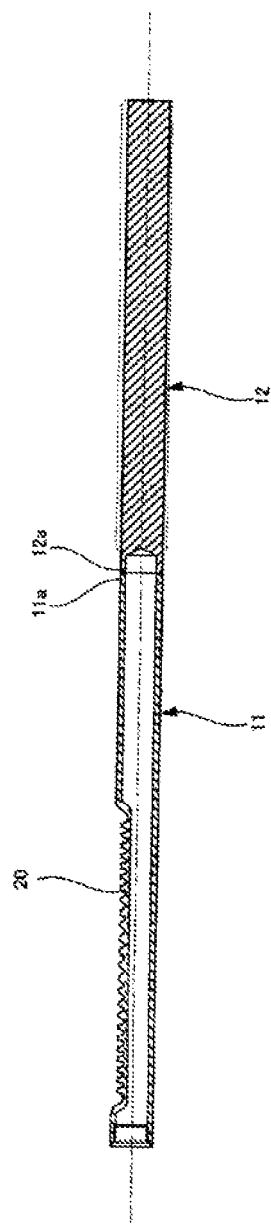
FIG. 11 is a schematic view illustrating another step for manufacturing the rack bar of FIG. 8.

As shown in FIG. 11, in the second embodiment, the second bar member 12 is corrected so as to be coaxial with the first bar member 11 by outer-diameter cutting. In the illustrated example, the outside-diameter cutting is performed along the entire axial length of the second bar member 12 such that the second bar member 12 is coaxial with the first bar member 11 and has the same outside diameter as the first bar member 11 along the entire axial length of the second bar member 12. However, the second bar member 12 may be formed to have an outside diameter different from the outside diameter of the first bar member 11. The outside-diameter cutting may be performed only along a portion of the second bar member 12 in the axial direction including a section where the second toothed portion 21 is formed in a later process so that only the portion of the second bar member 12, including the section where the second toothed portion 21 is formed, is formed is be coaxial with the first bar member 11.

Figure 12:
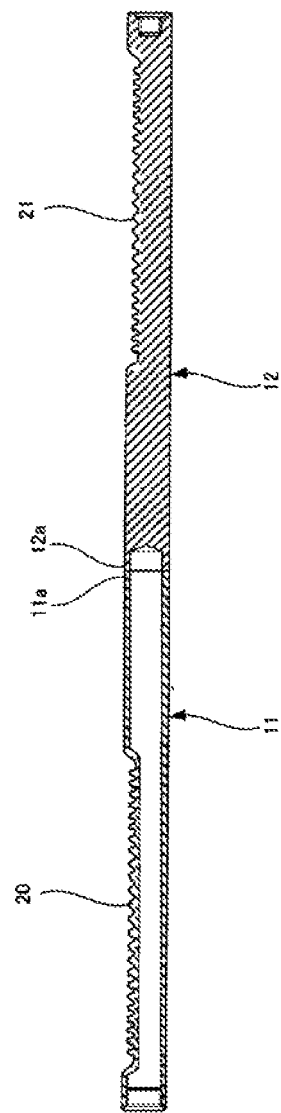
FIG. 12 is a schematic view illustrating yet another step for manufacturing the rack bar of FIG. 8.

Then, as shown in FIG. 12, rack teeth are formed on the given section of the second bar member 12 to form the second toothed portion 21 by cutting using a broaching machine or the like, and heat treatment, such as quenching, may be optionally performed on the second toothed portion 21. Surface finishing, such as grinding, may be performed on the second bar member 12 between the outside-diameter cutting and the teeth cutting.

The rack bar 10 manufactured as described above has improved straightness because the second bar member 12 is formed to be coaxial with the first bar member 11 by the outside-diameter cutting as shown in FIG. 11.

The outside-diameter cutting shown in FIG. 11 also removes the internal stress remaining in the surface layer of the blank second bar member 12.

The solid member serving as the blank second bar member 12 is generally produced by a drawing process. This type of solid member has internal tensile stress remaining in its surface layer and internal compressive stress remaining in its deep layer. The internal tensile stress is greater at a location closer to the surface layer, and the internal compressive stress is greater at a location closer to the deep layer. The internal tensile stress or the internal compressive stress remaining in the intermediate layer between the surface layer and the deep layer is smaller than the internal stress remaining in the surface layer and the internal stress remaining the deep layer.

By cutting the outside diameter of the second bar member 12, the surface layer of the material is removed, and the intermediate layer having smaller internal stress than the surface layer is exposed. The rack teeth of the second toothed portion 21 are formed on this intermediate layer. Therefore, even when the internal stress is released by teeth cutting and heat treatment, the deformation of the second bar member 12 due to the release of the internal stress is suppressed.

Figure 13:
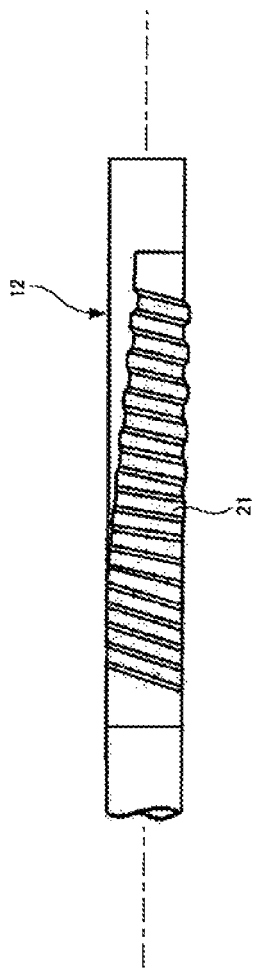
FIG. 13 is a schematic view illustrating an example of a deformation of the rack bar.

As the deformation of the second bar member 12 due to the release of the internal stress, torsion around the center axis thereof can be taken as an example as shown in FIG. 13. In the case that the torsion of the second bar member 12 occurs, the pitch of the rack teeth on the second toothed portion 21 is changed, the engagement of the rack teeth with the pinion is degraded and there is a danger that transmission efficiency may be degraded. Removing the internal stress remaining in the surface layer of the blank second bar member 12 by performing the outside-diameter cutting is particularly effective in suppressing the torsion of the second bar member 12 which may cause degradation in transmission efficiency.

The cutting stock of the blank second bar member 12 for the outside-diameter cutting is set in consideration of, for example, a possible misalignment or inclination of the second bar member 12 with respect to the first bar member 11 and a distribution of internal stress remaining in the blank second bar member 12. An example of preferable cutting stock is 1 mm to 2 mm in diameter.

As described above, the second bar member 12 joined to the first bar member 11 is formed so as to be coaxial with the first bar member 11 by performing the outside-diameter cutting, and then the rack teeth of the second toothed portion 21 are formed at the portion of the second bar member 12 subjected to the outside-diameter cutting, whereby the straightness of the rack bar 10 can be enhanced, the deformation of the second bar member 12 can be suppressed, and the shape accuracy of the rack bar 10 can be enhanced.

Figure 14:
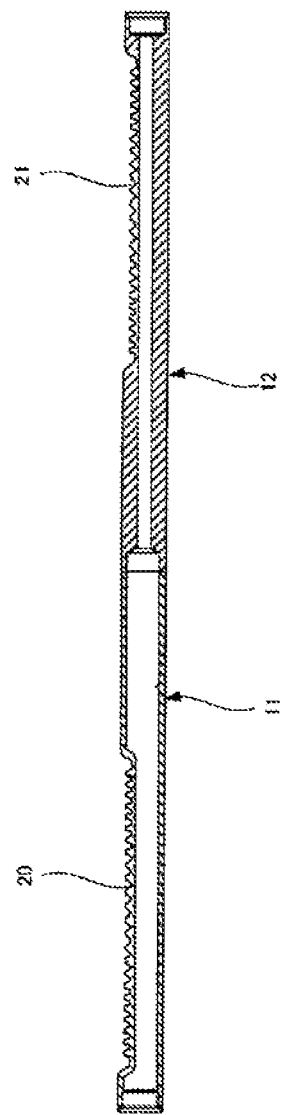
FIG. 14 is a cross-sectional view of a modified example of the rack bar according to the second embodiment of the present invention.

While the second bar member 12 has been described as a solid member having a greater diameter than the first bar member 11 in the example described above, the second bar member 12 may be a hollow member having a greater diameter than the first bar member 11 as shown in FIG. 14.

Also with the hollow second bar member 12, a rack bar can be manufactured by cutting the outside diameter of at least a portion of the second bar member 12 that has been joined to the first bar member 11 to form the portion of the second bar member 12 to be coaxial with the first bar member 11 and by forming a power transmission section including rack teeth, a screw groove or the like on the portion of the second bar member 12 that has been subjected to the outside-diameter cutting.

The manufacturing method according to the first embodiment may include, between the wall-thickening process shown in FIG. 6 and the teeth cutting process shown in FIG. 7, cutting of the outside diameter of the second bar member 12 with the center axis of the first bar member 11 being a reference. This additional step further improves the straightness of the rack bar 10, and removes the internal stress remaining in the surface layer of the blank second bar member 12.

A hollow member is also generally produced by a drawing process. Therefore, the hollow member also has internal tensile stress remaining in its surface layer and internal compressive stress remaining in its deep layer, and the tensile or internal compressive stress remaining in the intermediate layer between the surface layer and the deep layer is smaller than the internal stress remaining in the surface layer and the internal stresses remaining in the deep layer.

While the power transmission section formed on the second bar member 12 has been described as the second toothed portion 21 having a plurality of rack teeth in the example described above, the power transmission section is not limited to such a toothed portion, and may be the screw groove of a ball screw.

This application is based on Japanese Patent Application Nos. 2015-217043 and 2015-217044, both filed on Nov. 4, 2015, the entire contents of which are incorporated herein by reference.

The invention claimed is:

1. A method for manufacturing a rack bar, the method comprising:

joining an axial end portion of a first bar member and an axial end portion of a second bar member to each other, the first bar member and the second bar member being hollow members, and the first bar member having a toothed portion along an axial direction, and the toothed portion having a plurality of rack teeth, thickening a wall of at least a portion of the second bar member having an outside diameter that is greater than an outside diameter of the first bar member, the second bar member having been joined to the first bar member, along the axial direction by reducing the outside diameter of the second bar member to be the same as the outside diameter of the first bar member such that the portion of the second bar member is coaxial with the first bar member, and forming a power transmission section on the wall-thickened portion of the second bar member.

2. The method according to claim 1, wherein the wall of at least the portion of the second bar member is thickened such that the portion of the second bar member is coaxial with the first bar member by swaging at least the portion of the second bar member joined to the first bar member.

3. The method according to claim 1, wherein the power transmission section is formed after cutting the outside diameter of the wall-thickened portion of the second bar member such that the wall-thickened portion of the second bar member is coaxial with the first bar member.

4. The method according to claim 3, further comprising performing a heat treatment on the power transmission section formed on the second bar member.

5. The method according to claim 1, wherein the first bar member and the second bar member are joined to each other by a friction welding, the friction welding including rotating the first bar member and the second bar member relative to each other around a center axis of the first bar member.

6. The method according to claim 5, wherein the first bar member and the second bar member are joined to each other by the friction welding in a state in which the axial end portion of the second bar member is preformed in a ring shape having a same inside diameter and a same outside diameter as the axial end portion of the first bar member.

* * * * *